United States Patent [19]

Chang et al.

[11] Patent Number: 5,680,608
[45] Date of Patent: Oct. 21, 1997

[54] METHOD AND SYSTEM FOR AVOIDING BLOCKING IN A DATA PROCESSING SYSTEM HAVING A SORT-MERGE NETWORK

[75] Inventors: Amy Chang, Cortlandt Manor; Hui-I Hsiao, Yorktown Heights; Anant D. Jhingran, Elmford; Walter Gene Wilson, New Paltz, all of N.Y.

[73] Assignee: International Business Machines Corporation, Armonk, N.Y.

[21] Appl. No.: 384,067

[22] Filed: Feb. 6, 1995

[51] Int. Cl.⁶ .......................... G06F 15/80; G06F 17/30
[52] U.S. Cl. .......................... 395/608; 395/609; 395/490; 395/800; 395/858; 370/235
[58] Field of Search .......................... 395/600, 275, 395/200, 375, 650; 370/60; 364/200

[56] References Cited

U.S. PATENT DOCUMENTS

| | | | |
|---|---|---|---|
| 4,380,063 | 4/1983 | Janson et al. | 370/60 |
| 4,875,224 | 10/1989 | Simpson | 375/118 |
| 5,055,999 | 10/1991 | Frank et al. | 364/200 |
| 5,243,699 | 9/1993 | Nickolls et al. | 395/275 |
| 5,412,784 | 5/1995 | Rechtschaffen et al. | 395/375 |
| 5,448,735 | 9/1995 | Anderson et al. | 395/650 |
| 5,550,982 | 8/1996 | Long et al. | 395/200 |

*Primary Examiner*—Thomas G. Black
*Assistant Examiner*—Cheryl R. Lewis
*Attorney, Agent, or Firm*—Raymond M. Galasso; Jenkens & Gilchrist; Richard P. Ludwin

[57] ABSTRACT

In a system having producer and consumer processes, a producing process look ahead in its outgoing data stream to ensure that there is data available to consumers on all outgoing streams. The producer looks ahead by keeping a data array in its memory space with an entry for each connected consumer. When the outgoing data stream becomes blocked, the producer searches the array for empty connections. Then, the producer scans the outgoing data stream for messages to send over the empty connections and sends such messages. Periodically, the producer checks the original connection to see if the blocking condition has ended.

5 Claims, 3 Drawing Sheets

METHOD AND SYSTEM FOR AVOIDING BLOCKING IN A DATA PROCESSING SYSTEM HAVING A SORT-MERGE NETWORK

TECHNICAL FIELD OF THE INVENTION

This invention pertains in general to data processing systems and in particular to parallel database systems and more particularly to systems wherein multiple processes merge sorted streams of data.

BACKGROUND OF THE INVENTION

Blocking conditions often occur in parallel databases that use parallel sort/merge algorithms for sorting and joining data. A blocking condition, or deadlock, is an error condition in which processing cannot continue because each element of a process is waiting for an action by or response from another element.

Prior art parallel databases have multiple producer and consumer processes which sort and merge data. Each producer may produce more than one stream. Each consumer may consume more than one stream. In addition, each process can be both a producer and consumer. The data streams flow from producers to consumers and constitute a directed graph. The processes are the nodes of the graph while the streams are the edges. Data sent on the streams are also called "messages."

Each producer can send messages over any of its streams. However, when a producer needs to send a message on a particular stream, it must send that message before it can produce another. The streams, in turn, have a finite capacity. Therefore, a producer can be forced to wait if the stream on which it must send a message is at capacity.

Consumers merge messages from at least two incoming data streams into outgoing data streams. A consumer must receive messages from all incoming streams before it can process the messages.

The respective needs of producers and consumers can lead to a blocking condition. For example, consider a 4 node system with two producers, P1 and P2 producing data streams to each of 2 consumers, C1 and C2.

In this example, a deadlock condition occurs when the connections P1-C1 and P2-C2 are full, with P1 and P2 waiting to put messages in their respective connection. At the same time, C2 cannot proceed until it gets a message from P1 and C1 cannot proceed until it gets a message from P2. This situation effectively brings processing to a halt.

SUMMARY OF THE INVENTION

Therefore, it is an object of the present invention to provide a system and method which provides non-blocking data flow between processes.

The above and other objects are achieved by having a producing process look ahead in its outgoing data stream to ensure that there is data available to consumers on all outgoing streams. The producer looks ahead by keeping a data array in its memory space with an entry for each connected consumer. When the outgoing data stream becomes blocked, the producer searches the array for empty connections. Then, the producer scans the outgoing data stream for messages to send over the empty connections and sends such messages. Periodically, the producer checks the original connection to see if the blocking condition has ended.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFFERRED EMBODIMENT OF THE INVENTION

Figure 1:
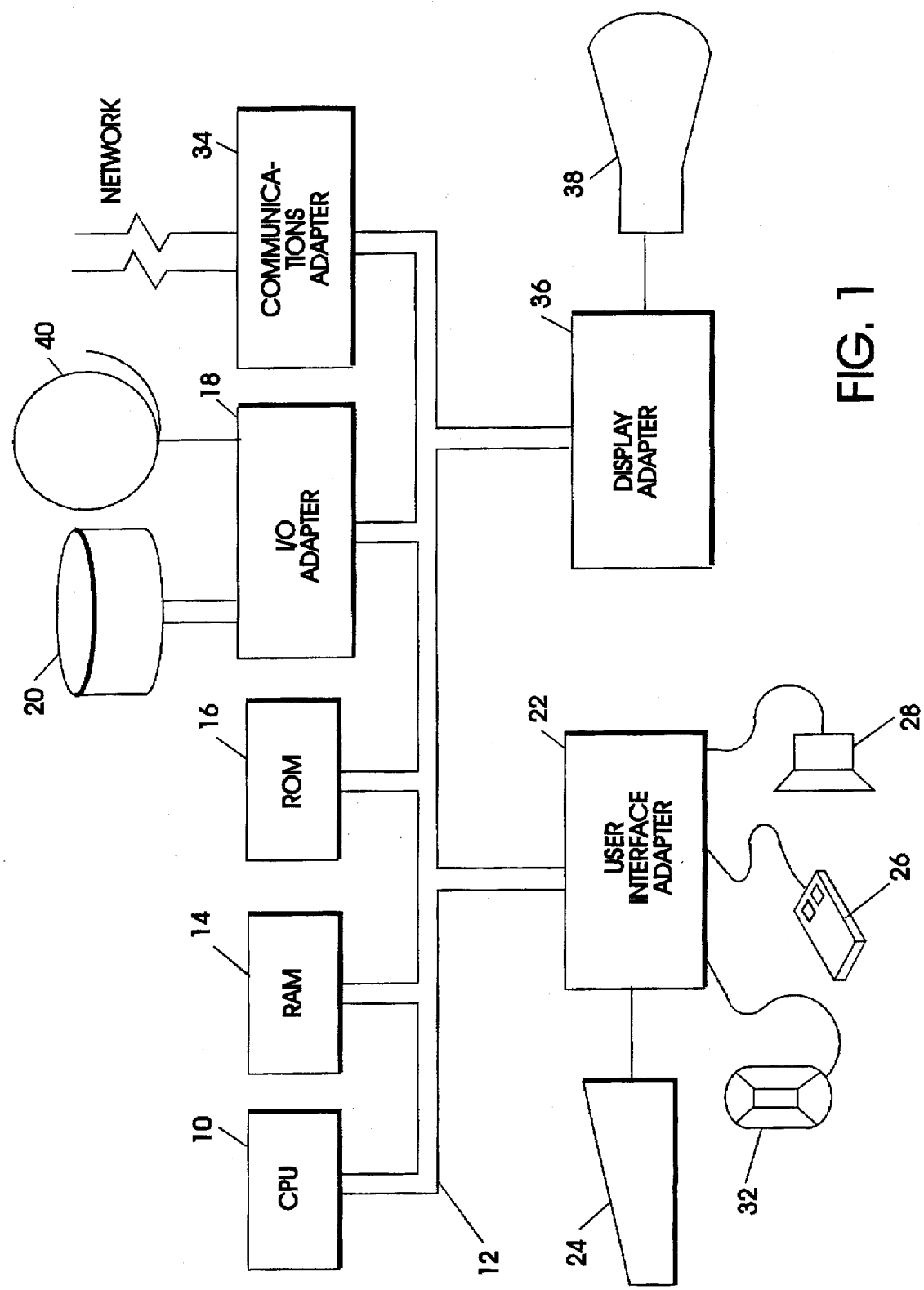
FIG. 1 shows a data processing system adapted for execution of a preferred embodiment of the present invention.

A hardware system for practicing the present invention is depicted in FIG. 1, which illustrates a typical hardware configuration of a workstation in accordance with the subject invention having at least one processing unit 10, such as a conventional microprocessor, and a number of other units interconnected via system bus 12. The workstation shown in FIG. 1 includes random access memory (RAM) 14, read only memory (ROM) 16, and input/output (I/O) adapter 18 for connecting peripheral devices such as disk units 20 and tape drives 40 to bus 12, user interface adapter 22 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

Figure 2:
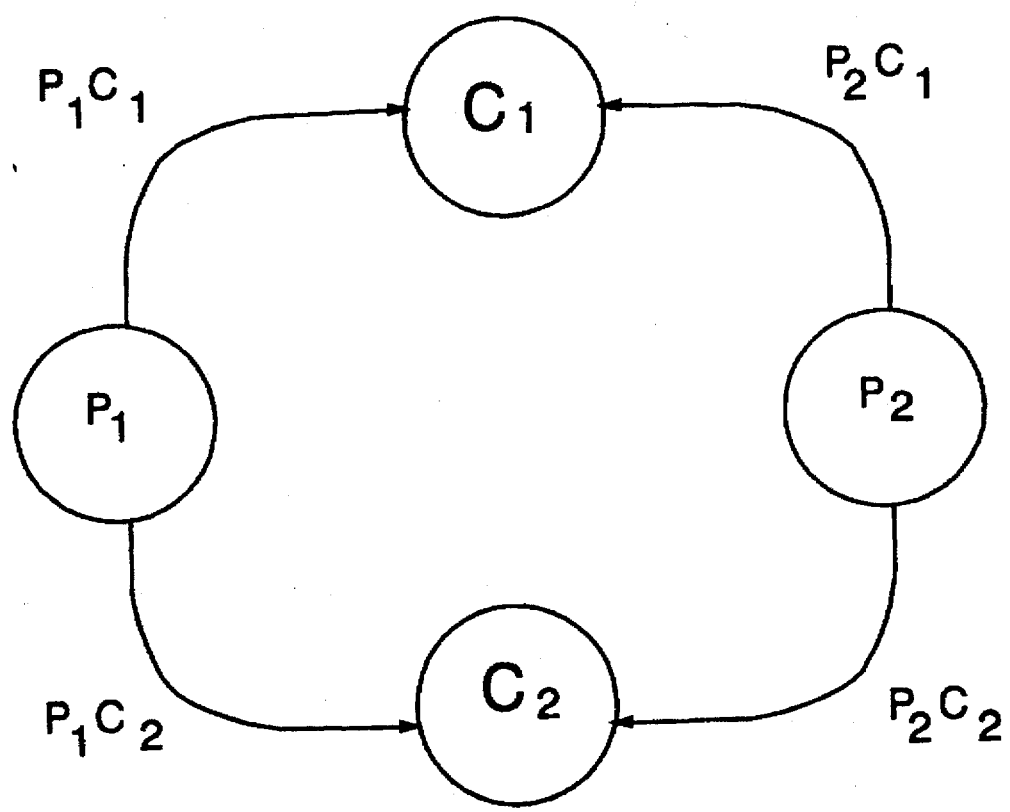
FIG. 2 shows a representation of a sort-merge network.

Referring now to FIG. 2 a sort-merge network according to the present invention will be described. This system is stored in RAM 14 and executed by processing unit 10. The system includes two producing processes P1 and P2 and two consuming processes C1 and C2. P1 is linked to C1 and C2 by connections P1C1 and P1C2, respectively. Likewise, P2 is linked to C1 and C2 by connections P2C1 and P2C2.

P1 and P2 each receive data from incoming data streams (not shown). P1 and P2 sort incoming data and send it to C1 and C2. The sorting algorithm is user-definable. For example, if the incoming data are integers the producers can be configured to send even integers to C1 and odd integers to C2. Each producer maintains an index showing the point in its processed incoming data stream that has been sent to consumers C1 and C2. A preferred embodiment of the present invention is to count the outgoing data and store this count in the producer index. Thus, the value of the producer index is the offset from the first-sent piece of data.

Each producer has an N-entry array, where N is the number of outgoing connections from that producer. Thus, P1 and P2 each have a two entry array. Each array is held in RAM 14 in a space associated with its respective producer.

Each array entry holds a byte offset showing the point in the processed incoming data stream that has been sent to the consumer associated with that entry. When a producer has no more data for a connection, the associated array entry holds an end-of-file marker.

Connections P1C1, P1C2, P2C1 and P2C2 are able to store and buffer data but have a fixed capacity. Data sent over these connections can include messages from the producers to the consumers. When a producer knows it has no more data for a connection, it may close that stream by sending an "end of stream" message to that connection's consumer. Consumer processes do not wait for data on a closed connection. When the data connections are initially formed, handshaking is established between the producers, consumers and connections. This handshaking gives the producers and consumers information such as the connections' capacity.

Figure 3:
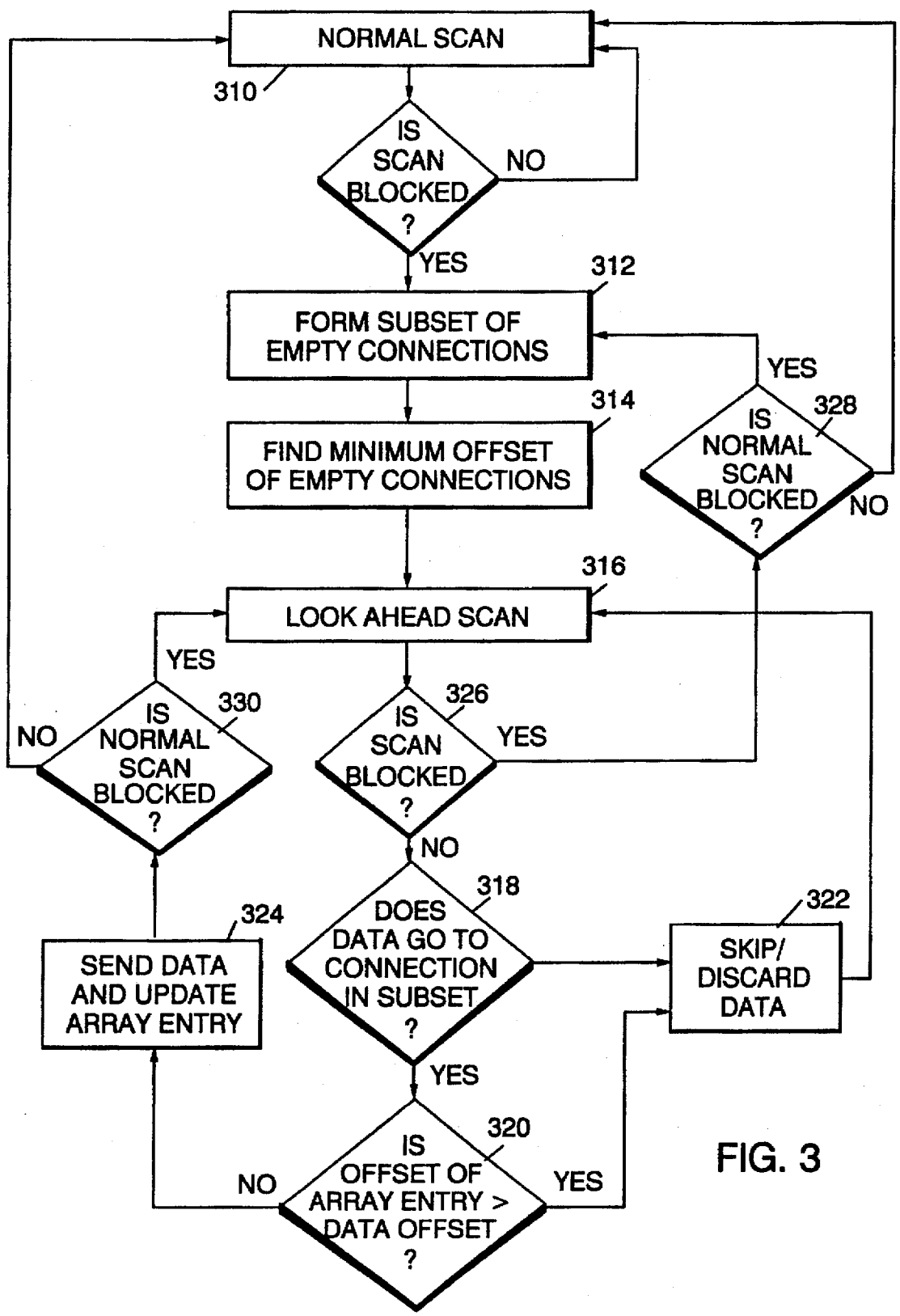
FIG. 3 is a flow chart showing the steps performed by a preferred embodiment of the present invention.

FIG. 3 is a flow chart showing the sequence of steps followed by a producer having at least one input stream and several outgoing connections according to the present invention. At step 310, the producer performs its normal scan. The producer processes and sends data to consumers using a first-in first-out (FIFO) method. That is, the producer sequentially processes the incoming data streams and sends the data to the consumers in the same order that it was received. As the producer sends the data, it updates the producer index to reflect the amount of data sent to the consumers.

When the producer needs to send data on an outgoing connection, and that connection is full, the producer searches its handshaking information to form a subset, or group, of empty connections (step 312). Then, at step 314, the producer searches the array entries of the connections in the subset to find the entry with the minimum byte offset that is greater than the producer offset.

Starting with the minimum byte offset, the producer scans ahead in the incoming data stream and processes the data (step 316). When a data item is processed, the producer checks to see whether it should be sent to a connection in the subset (step 318). The producer also compares the offset of that data item with the offset in the array entry corresponding to the connection to which the data will be sent (step 320). If the data item's offset is smaller than that of the array entry, then the data has already been sent and is, therefore, discarded (step 322). Otherwise, the data is sent to the consumer via the connection and that connections corresponding array entry is updated with the offset of the sent data (step 324).

If the look ahead scan becomes blocked (step 326), meaning a connection on which the producer must send data is full, the producer will first check the blocking condition on the normal scan (step 328). If the normal scan is not blocked, the producer will return to step 310 and resume the normal scan from the point identified by the producer index. Otherwise, the producer will return to step 312 and, if possible, form a new subset of empty connections. In addition, the producer will periodically recheck the blocking condition on the normal scan (step 330). If the normal scan is found to be unblocked, the producer will resume that scan (step 310).

An alternative embodiment of the present invention is to begin a look ahead scan on each connection as soon as that connection becomes empty. This alternative embodiment reduces the chance that a consumer process would have to wait for data, but increases the number of look ahead scans that must be performed. Thus, whether this embodiment is better than that described above depends on the resource costs of a look ahead scan and the distribution of the incoming data.

Although the present invention and its advantages have been described in detail, it should be understood that various changes, substitutions and alterations can be made herein without departing from the spirit and scope of the invention as defined by the appended claims.

What is claimed is:

1. A method of avoiding blocking in a data processing system having producers sending data to consumers via connections, comprising:

detecting when an outgoing data stream is blocked because a connection connecting a producer to a consumer is full;

forming a subset of at least one empty connection from said connections;

forming an array having an entry corresponding to each of said empty connections in said subset;

storing an offset in each of said array entries;

scanning said outgoing data stream for data to send to said subset;

sending said data to said subset until said outgoing data stream is no longer blocked; and wherein said sending said data to said subset until said outgoing data stream is no longer blocked comprises the steps of:

determining whether said data is associated with an empty connection in said subset;

determining whether said offset of said array entry corresponding with said empty connection is less than an offset of said data;

sending said data to said empty connection in said subset when said offset of said array entry is less than said offset of said data; and updating said offset of said array entry when said data is sent to said empty connection in said subset.

2. The method of claim 1, wherein said scanning said outgoing data stream for data to send to said subset comprises the step of searching for a minimum offset in one of said array entries that is greater than said offset of said data.

3. The method of claim 1, further comprising the step of checking said connection periodically to determine whether said connection is still full.

4. A data processing system for avoiding blocking in a sort-merge network having producers sending data to consumers via connections, comprising:

means for producing an outgoing data stream containing said data;

detection means for detecting when said outgoing data stream is blocked because a connection connecting a producer to a consumer is full;

forming means for forming a subset of at least one empty connection from said connections;

scanning means for scanning said outgoing data stream for data to send to said subset;

sending means for sending said data to said subset until said outgoing data stream is no longer blocked; and wherein said scanning means further comprises an array corresponding to said subset, said array having an entry corresponding to each of said empty connections in said subset, each said entry having an offset;

and wherein said sending means further comprises:

an offset associated with said data;

first determining means for determining whether said data is associated with an empty connection in said subset;

second determining means for determining whether an offset of said array entry corresponding with said empty connection is less than said offset of said data; and updating means for updating said offset of said array entry when said data is sent to said empty connection in said subset.

5. The data processing system of claim 4, further comprising checking means for checking said connection periodically to determine whether said connection is still full.

* * * * *